(12) United States Patent
Kraft (10) Patent No.: US 6,458,492 B1
(45) Date of Patent: Oct. 1, 2002

(54) MASK CHANGING THE BRIGHTNESS PROFILE OF A PHOTOGRAPHIC COPY

(75) Inventor: Walter Kraft, Zürich (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/489,948

(22) Filed: Jan. 24, 2000

(30) Foreign Application Priority Data

Jan. 29, 1999 (EP) .............................. 99101595

(51) Int. Cl.$^7$ .............................. G03C 5/08; G03C 7/18; G03B 27/80; H04N 1/46
(52) U.S. Cl. .............................. 430/4; 430/21; 430/20; 430/22; 355/38; 358/475; 358/505; 358/520
(58) Field of Search .............................. 430/4, 21, 22, 430/20; 358/520, 505, 475; 355/38

(56) References Cited

U.S. PATENT DOCUMENTS

| | | | |
|---|---|---|---|
| 5,119,125 A | 6/1992 | Kraft | .......................... 355/38 |
| 5,365,353 A | 11/1994 | Kraft | .......................... 358/518 |
| 5,805,274 A | 9/1998 | Saita | .......................... 355/38 |

FOREIGN PATENT DOCUMENTS

| | | |
|---|---|---|
| DE | 4040498 A1 | 6/1992 |
| DE | 19703063 A1 | 8/1998 |

OTHER PUBLICATIONS

R.W.G. Hung: "The Reproduction of Color" XP–002109511, 1995, Fountain Press, England pp. 100–103, 319–360, 628–631, and 672–702.

*Primary Examiner*—Richard L. Schilling
(74) *Attorney, Agent, or Firm*—Burns, Doane, Swecker & Mathis, LLP (57) ABSTRACT

Process for determining a mask for changing a brightness profile of a photographic copy with the following steps: photographic image data are derived from photographically recorded image information; optimized image data are obtained by correction of the photographic image data, wherein errors which were created to during the photographic recording of the image information are considered; a brightness mask, the values of which embody an influencing of the brightness profile of the photographic copy is determined based on the optimized image data.

16 Claims, 7 Drawing Sheets

MASK CHANGING THE BRIGHTNESS PROFILE OF A PHOTOGRAPHIC COPY

BACKGROUND OF THE INVENTION

1. Field of the Invention

The present invention relates to process for determining a mask for changing the brightness profile of a photographic print or copy. Furthermore, the invention relates to a process for changing the brightness profile during the manufacture of a print or copy by way of the mask determined in accordance with the invention. Finally, the invention relates to an optimal printer and a digital printer which use the mask determined in accordance with invention.

2. Background Information

The term "photography", as used herein, refers to the (permanent) recording of images produced by electromagnetic radiation (especially light) by means suited herefor (for example, a camera with film, a digital camera with CCD-chip, a film camera, a video camera, and the like).

The field of the present invention relates to the computer and/or optical processing of the photographic image information which represents the picture produced. The photographic image information is thereby obtained, for example, by scanning a photographic master (for example a film) and converted into digital image data. The photographic image information can also be already present in digital format. It can then be stored, for example, electronically (for example, CD-ROM, DVD), can be accessible through a network (for example LAN or Internet) or can be recorded, for example, with a digital camera.

Photographic image data can be copied such as conventional image data onto a physical medium. For example, photographic paper serves as physical medium onto which photographic films are exposed. The copying can also be carried out by way of a digital printer, which is controlled by the photographic image data, and onto normal paper or photographic paper. However, the quality of the thereby achieved photographic prints is often unsatisfactory.

An essential reason for this is that the dynamics of the luminescence included in the image information to be copied cannot be transposed onto the copying medium. The reason for that is, for example, that photographic paper compared to a photographic film has a highly reduced dynamic luminescence range. But also the dynamic luminescence region which can be illustrated with a printer is smaller than the typical dynamic luminescence range of photographic image information.

The above-mentioned disadvantages encountered during the physical realization of a photographic copy have as a result that the subjectively observed brightness profile during observation of the copy is negatively distinguished from the subjectively observed brightness profile of the photographic image information underlying of the copy. This means that the picture feel is not optimal for an average observer during observation of the copy.

For example, brightness differences which often are still distinguishable for an observer of the original photographic image information are no longer distinguishable for an observer of the photographic copy when those brightness differences are found in a dark or very bright region of the photographic copy.

In order to overcome this disadvantage, masks were proposed which cause a brightening or darkening of certain regions of the copy. Such masks are described, for example, in DE 19703063 A1 or in DE 4040498 A1. A calculated mask is used therein to control an LCD matrix. This LCD matrix is found during the exposure of a photographic film onto a photographic paper in the therefore required optical copying light path and changes the brightness of the manufactured copy by region. Image data obtained from the original (photographic) image information are exclusively used for the calculation of the masks.

It is a disadvantage of the previous processes, that photographic errors included in the original photographic image information, such as color errors or errors in the brightness distribution enter into the calculation of the mask. The photographic errors can be caused, for example, by errors during photography (underexposure or overexposure), specific film properties (color shifts caused by the film) or by the spectral sensitivity of the CCDs of the digital camera used.

However, when the photographic errors enter into the calculation of the matrix, no optimal manipulation of the brightness profile of the desired photographic copy can be achieved.

SUMMARY OF THE INVENTION

It is accordingly an object of the invention to optimize the calculation of a mask for the change of a brightness profile of a photographic copy in such a way that negative effects of photographic errors are suppressed.

A mask is calculated with the process in accordance with the invention which is used for changing the brightness profile of a photographic copy.

According to the process, photographic image data are first derived from photographic image information, which includes the image information to be copied, whereby preferably a reduction (associated with loss) of the image information content, especially the image resolution, takes place. The photographic image information can include more image information than is copied, for example, the photographic image information can represent a sequence of images (for example, a film with several individual pictures or a recording sequence of a digital camera), whereby in accordance with the invention the brightness profile of the copy of one of these images is changed or the mask required therefor is determined. The image information corresponding to the remaining images can be used in accordance with invention for determination of the brightness mask (for example by way of complete film analysis). Also, the image information of a whole image can be used, when only a section of the image is to be copied. The photographic image information can be, for example, a photographic film (complete film, individual picture). The photographic image data are preferably digitalized during derivation from the photographic image information and can be derived, for example, by scanning (for example of the complete film or of only an individual picture or a section thereof) and alternatively during further processing (for example data reduction and/or smoothing). However, the photographic image information can also be present in digital form, for example, when it originates from a digital camera or is transferred through a network, for example. The photographic image data can then be derived from these digital data, in that, for example, the digitally available photographic image information is taken over 1:1. However, an especially loss associated data reduction, especially a resolution reduction, and/or smoothing is carried out in order to minimize the subsequent calculation effort.

Overall it is preferred that the number of data which include the derived photographic image data (especially per individual picture), is about 10,000 or less, preferably less than 2000 and especially preferably about 1000 (or less). Good results can be achieved in practical use even with such a reduced data volume. The calculation effort is simultaneously minimized. Especially for the generation of photographic image data by scanning an original film, one can choose an only coarse scanning from the start so that the time required for the scanning process is significantly reduced compared to a fine scanning (as is common in the prior art) and the number of the photographic image data is at the same time reduced to the desired amount.

The reduction has the further advantage that finer details of the photographic image information (of the photographic original or the scene illustrated thereby) have no influence on the masking. The already mentioned smoothing can also be of use for this purpose, whereby, for example, the image data which are reduced during the derivation from the image information to a desired number (for example in the form of a reduced image matrix) are subjected to a low pass filtering. It is advantageous in the case of color photo image data (for example a colored image matrix) to transform the color values into a color area wherein one of the axes describes the brightness of the image points. If the color information is not used in the further processing (for example for the analysis), it is also sufficient to calculate gray values from the color values (for example, by weighted averaging), which characterize the brightness of individual image points. The reduction and a matrix transformation connected therewith is described in detail in the EP 0475897. The disclosure of the reference EP 0475897 A1 is herewith incorporated into the present disclosure.

In accordance with the invention, the photographic image data which are preferably present in digital form are corrected in order to obtain optimized image data. Preferably, only that part of the photographic image data is corrected and converted into optimized image data, which corresponds to image information to be copied or to a portion to be copied. During the correction, errors are considered which were generated during the photographic recording of the image information. Optimized image data are thereby obtained which at least approximate the image data which are derived from an ideal photographic image information, which represents the photographically recorded object without error, which means corresponding to reality. Error-free recording means especially that the photographically recorded image information is free of color change. This means that the colors do not change upon a variation of the photographically recorded light amount and with a constant spectrum, so that no color change is present. Especially photographic films exhibit color change.

A correction of the photographic image data can be carried out on the basis of an analysis of an image sequence, as described or for example, in EP 0586773, which is herewith incorporated into the present description. The analysis of a whole film ("complete film analysis") is described in the EP 0586773. For example, the color change of a film is derived from the analysis results. The result of the analysis is then used for the correction of the color dependent exposure.

If an image sequence analysis (for example, complete film analysis) is carried out in accordance with invention, in order to recognize the errors which were generated during the photographic recording of the image information and to be able to take them into consideration, the photographic image data are derived from image information which includes more than one individual picture. Then, for example, the color values are analyzed, especially statistically analyzed. A color area standardization (see also EP 0586773) is then carried out for correction depending on the analysis results. This is preferably achieved by a translation and rotation of the color area. The translation thereby takes into consideration the mean coloring and density of the actual film and the rotation its exposure dependent color change ("tipping"). After standardization of the color area (i.e. the correction process), the image data are largely cleared of film based distortions (i.e. errors in the photographic image recording), so that, for example, ideally the same scene, when photographed with different films, always leads to the same optimized image data. An image sequence analysis, especially with color area standardization derived therefrom, is important, since a large number of film products are on the market with sometimes significantly different image recording properties. This is also the case for the image recording properties of the different digital cameras.

In accordance with invention, alternatively or additionally other analysis types can also be selected apart from an image sequence analysis, in order to recognize the errors during image recording and to then take them into consideration for the correction. For example, one can revert back to stored data which include typical image recording properties of different films or digital cameras. The selection amongst different stored data can, for example, be carried out by reference to information, which was additionally stored by the image information carrier (for example, film cartridge or diskette) apart from the image information and, for example, regarding the film type or camera type or regarding the recording situation (artificial light or daylight) and which is also stored during the detection (recording) of the photographic image information (for example, during photography) (for example, data which are stored according to the Advanced Photo System or APS).

With respect to the consideration of film specific data, reference is again made to EP 0586773 A1.

In addition to or in the alternative to the above analysis methods, an individual image analysis can be carried out. This means that the analysis is supported by the photographic or already optimized image data of an individual image which, for example, at least essentially correspond to the image information to be recorded or include the image information to be recorded as an image portion. If only the portion of an image is to be copied (for example, panoramic image with APS), the analysis can be based, for example, on only the image data which correspond to the portion, or in addition on image data which lie outside the portion, but are part of the recorded individual image. The image attributes of an individual image are those properties of the image information representing an individual image, which can be extracted by individual image analysis from the photographic image data derived therefrom. These image attributes describe especially those attributes which especially influence the picture feel (the sensory perception). With such an analysis, especially the coloring, the contrast, the exposure as well as the color, brightness and contrast profiles are determined and examined. Furthermore, the analysis is carried out especially for the recognition of color and/or brightness errors. Also, tipping phenomena (color differences between bright areas and shadows) should be recognized.

Preferably, the analysis of the photographic image data is used for classification of the image data. This means the photographic image data are assigned to a specific class of images. Possible image classes are, for example, counter light pictures, flashlight pictures, artificial light pictures, etc. However, classes can also be used which cannot be translated directly into photographic terms in the art, in any event, the goal of the classification is the recognition of images with similar image attributes, especially with respect to contrast, exposure, coloring, etc.

Preferably, the individual attributes are combined into a N-dimensional attribute vector for the classification. The N-dimensional attribute area is (for example, by way of a clustering process) divided into continuous regions, or by each region corresponds to a class. The attribute vectors which fall within the same region originate from image information with similar image properties and are assigned to the same class.

The individual image analysis can be carried out, for example, on the basis of the photographic image data, in order to correct the photographic image data and to achieve optimized image data or to participate in their determination, for example, depending on the classification which took place. However, the individual image analysis is preferably carried out on the basis of the optimized image data. Preferably, the correction of the photographic image data and the determination of the optimized image data is in this case carried out on the basis of an image sequence analysis or on the basis of stored typical image recording data (or a combination thereof, see above).

The results of the individual image analysis are preferably she used to modify the optimized image data. This modification is preferably carried out in dependence of the classification result. The image attributes obtained from the individual image analysis, or the classification result can alternatively or additionally also enter into the determination of the brightness mask from the optimized image data and thereby modify the values of the brightness mask. The above-mentioned modifications are preferably carried out on the basis of the image attributes of an individual image, which were extracted from the optimized image data. However, they can also be carried out on the basis of other attributes of the optimized image data, for example, attributes of an image sequence. This is especially then advantageous when an image series (for example, with sports pictures) was recorded or when the photographic image information was recorded, for example, with a video camera. A uniform copy quality can be achieved in this manner for the images of a series.

The correction of the photographic image data can be carried out in several ways, for example, pixel by pixel or by blocks using a correction function. However, a correction transformation is preferably carried out, whereby the fields recognized, for example, by the analysis, are considered during the image recording or at least approximately compensated.

A translation and a rotation of the color area is preferably carried out with this correction transformation. Optimized image data are obtained with this correction transformation which is applied to the photographic image data. If a copy is produced on the basis of such optimized image data, that copy is more aesthetically pleasing to an observer than a copy based on the photographic image data. The optimized image data therefore have optimized image feel properties. Especially, irritating errors with respect to contrast, exposure and/or coloring are reduced. The correction transformation or a correction function can be optimized for example, with respect to these errors in a stepwise, especially iterative process consisting of copying, analysis of the copy, modification of the correction transformation, newly copying, etc.

In accordance with the invention the number of the optimized image data used as the basis for the mask calculation is preferably significantly reduced compared to the optimized image data eventually used as the basis for a photographic copy made with a digital printer. The former optimized image data can be derived from the latter optimized image data, for example, by a resolution reduction. However, the optimized data for the mask calculation are in this case derived from an already strongly reduced number of data, in accordance with invention.

Based on the optimized image data (for the mask calculation) which have been cleared of photographic errors or wherein the photographic errors have been at least minimized, a so-called brightness mask is then produced. This brightness mask includes values by which the brightness profile (the brightness distribution) of a photographic copy of the (original) photographic image information (for example, a film) is to be influenced.

The matrix so obtained can be, for example, stored or transferred for further processing to a device (for example, an optical or digital printer), which produces a copy of the photographic image information.

If the photographic image information is present in physical form, for example, as photographic film, the values of the brightness mask can be used for control of a light density control device, for example an LCD matrix. They can be especially used for control of the LCD device described in the European Application with the application No. 98115693.8, the disclosure of which is herewith incorporated and a copy of which is attached.

The values of the brightness mask are, as already mentioned, determined from the optimized image data. One preferably proceeds in such a way that first the gray values corresponding to these image data are determined from the optimized image data and then the values for the brightness mask are determined from those gray values.

The data processed by the process in accordance with invention are preferably arranged in a matrix format and processed by transformation of the matrices. Accordingly, the brightness mask is preferably also arranged as a matrix.

The values of the brightness mask are preferably determined in such a way that upon use of one region of the mask the brightness profile (the brightness distribution) of the photographic copy of that region of the photographic image information is influenced which also entered into the calculation of the mask region. Especially, regions in the copy with average brightness should not be influenced or only marginally influenced. Furthermore, regions of low brightness should be brightened (or remain unchanged) and/or regions with high brightness should be darkened (or remain unchanged). According to a preferred process, the brightening of dark regions is made dependent on the degree of the darkness so that the brightening in very dark regions is again attenuated or no longer carried out. Accordingly, the darkening of bright regions is preferably carried out such that the darkening in very bright regions is attenuated or possibly even completely left out.

In the just described exemplary embodiment of the brightness mask the change of the brightness profile is thus carried out depending on the brightness of the image data to be copied. More precisely, according to the present invention, the elements of the brightness mask are calculated from the optimized image data and especially from the corresponding gray values of the optimized image data. The calculated values are preferably a function of the optimized image data or the corresponding gray values. The function is preferably nonlinear. The function can be present, for example, in the form of a table or it can be realized as a programmed, partly linear function.

The function is preferably modeled so that it has the above described effect on the brightness profile of the photographic copy, for example, the brightening of dark regions at the darkening of bright regions. The degree of brightening or darkening is thereby preferably limited in such a way that upon copying or reproduction of the image no visible or irritating loss in total contrast occurs. Therefore, the already obtained analysis results or especially information on the contrast in regions of the image and/or the overall contrast preferably enter into the modeling of the function or the calculation of the mask elements. This information is obtained, for example, by the above described analysis which determines the characteristics of the photographic image data. In addition, or alternatively, a separate analysis of the optimized image data can be carried out from which the characteristics of the optimized image data are then derived which then enter into the calculation of the mask elements.

Furthermore, the degree of brightening or darkening is preferably limited so that the visibility of the noise, for example, the granularity, if the photographic image information is a negative film, is not excessively increased in the dark and or bright portions of the image. In order to determine the degree of limitation of the brightening or darkening, one can again go back to characteristics which were determined during the analysis of the photographic image data or during a separate analysis of the optimized image data (for example, overexposed, underexposed, etc.). Furthermore, information on the film type (for example, ASA No. regarding the granularity) or the photograph situation (for example, taken with flash) can enter into the determination of the function.

During the realization of the function, the limiting of the brightening or darkening can be carried out, for example, by setting a maximum value. The maximum value in turn can be a function of the specific characteristics of the photographic image information (for example, film type) or the specific characteristics of the photographic image data or the optimized image data (for example, total contrast).

The function is preferably modeled in such a way that no distortion due to image unrelated brightness jumps occurs during the masking. This means that the function to be used is preferably constant and that the slope of the function cannot be too large. It can be advantageous for this purpose to subject the brightness mask to a smoothing or to subject the matrix underlying the brightness mask to a low pass filtering.

As already mentioned above, specific characteristics or otherwise recorded characteristics or information (for example, data stored in addition to the image information during the image recording, especially data regarding the photograph situation or, for example, the camera type of a digital camera or the film type) can enter into the determination of a best suited function by the analysis of the image data. It is thereby advantageous to assign the different characteristics to different classes depending on the degree of their distinction. The best suited function is then again assigned to each class. The class formation and the function modeling for each class can then be refined with increasing experience level, for example, by way of an expert system.

Apart from the consideration of global properties, which are expressed in the image classes, it is also advantageous to consider local properties in the vicinity of a masking point. As described further below, a local control of the masking strength is preferably carried out herefor.

A local control of the masking strength is necessary, because, for example, it can lead to irritating effects when the brightness mask is superimposed with the image information used for the copy. This applies especially where the brightness profile of the image information to be copied has large jumps. For example, if a brightness step with a steep step flank of the image information to be copied is superimposed with an inverse brightness step with flat step flank of the mask, an edge superelevation can occur both in the positive as well as the negative direction. This means that at a step transition from dark to bright initially a normally dark value is present which then shortly before the step further darkens and then immediately after the step strongly brightens. The strong brightening is shortly thereafter reduced again to a normal bright value. Because of the low dynamic range of the photographic paper, the stronger darkening is normally not visible in contrast to the stronger brightening. For this reason, visible edge superelevation effects are preferably moved into such regions wherein an edge superelevation is not conspicuous for the observer. In the above described case, a mask would be structured such that an edge superelevation occurs only in the dark region (albeit stronger) and that no edge superelevation occurs in the bright region. The position of the step flank of the brightness mask is thereby changed in direction towards the darker region of the brightness step to be copied until it is completely located in the dark region.

In order to avoid undesired effects during the superimposition, for example, as are described above, the masking strength is controlled with local resolution in that preferably the values of the elements of the brightness mask are changed. The control is thereby preferably carried out such that the values in a local control region which includes an actual mask element and further mask elements are made the basis of the calculation from which a new value for the actual mask elements results.

Different nominal values or functions can be used during the calculation for the local control the results of which can be, for example, weighted and combined with one another. For example, the maximum value determination, the minimum value determination, the main value determination, the mean determination can be used as functions which are then preferably applied to the values in the mentioned manipulation region. However, the function for the determination of the standard deviation, of the detail contrast, etc. can also be used. If one uses only, for example, a minimum function, this results in the "careful" masking of the regions with higher mask values, which is equal to the flank displacement described above by example. In accordance with the invention, characteristics of the image recording (for example, film type, ASA number, etc.) and/or specific characteristics of the photographic image data and/or the optimized image data also enter into the determination of the type of the manipulation or the setting of the above-mentioned weighting during the manipulation of the values of the brightness mask. One can in this case also classify or go back to an already carried out classification. As already mentioned above, the manipulation functions (maximum function, minimum function, etc.) can be differently weighted during the determination of a new mask value. The structure of the weights can thereby be made dependent, for example, from the class specified.

The manipulation and thereby, for example, the structure of the weights can however also be made dependent from the properties (characteristics) of the different local regions of an individual image. Expressed otherwise, values of the brightness mask which concern regions of the copy with different characteristics or properties are differently manipulated. One property of the region represents, for example, it's information content ("energy density"). For example, information rich image regions typically have strong light/dark variations. Preferably, the manipulation is carried out such a way that information poor image regions are not masked or masked less strongly than information rich image regions. Image regions with different properties or attributes are recognized, for example, by way of a "local analysis" with which locally resolved regions of an image can be analyzed. This local analysis is based on, for example, a locally resolved light/dark analysis, and analysis of the light/dark variations or the contrast variations. The manipulation is carried out preferably locally differently depending on the local properties or characteristics of the image, especially a value of a brightness mask is manipulated depending on the characteristics (image characteristics) of an image region locally assigned to the value.

The local analysis/manipulation itself can be based on an analysis/manipulation of the photographic image data, optimized image data or the values of the brightness mask itself. Especially in the latter case, the analysis is preferably an integrated part of the calculation of a manipulated (modified) brightness mask (see further below, for example, the use of the standard deviation function). The local manipulation (modification) is preferably carried out such that the influencing of the brightness profile is locally "dosed" or varied so that locally a more or less strong influencing of the brightness profile results and depending on the locally assigned image attributes (attributes of the locally assigned image region).

To superimpose the brightness mask with the image information to be copied, it can be desired that the mask has a preselected number of elements. If the mask is present in matrix form, the matrix can be, for example, reduced or enlarged, in order to achieve an adaptation to the desired number or to a desired number of lines and columns.

Adaptation to a preselected number is especially then advantageous when a light control arrangement, for example, an LCD matrix, is controlled with the mask values during the exposure of a film onto a photographic paper. Such an LCD matrix has a preselected number of elements.

In the case in which the number of the mask elements is to be adapted, the determination of the brightness mask is preferably carried to in two steps. First, a first mask is calculated, which is to cause a brightening or darkening. This mask is preferably a matrix with the same dimensions as a matrix in which the optimized image data are illustrated. A second matrix with a fitting number of elements and with the desired number of lines and columns is then determined from the first mask. If one considers, for example, an actual element of the first mask, which is located in an assigned region, the values of the elements in this region are used as a basis for the manipulation of the value of the actual element and the value which results from the manipulation is assigned to that element of the second mask, which is assigned to the actual element of the first mask.

When, as discussed above, the local properties or actual units of an image are analyzed and if the manipulation is locally different depending on the local properties, the local properties or attributes of that region of the first mask are preferably considered for the calculation of each element of the second mask which is associated with that element. This applies especially when the first as well as the second mask are expressed in matrix format.

In the case of an optical masking, an optical mask (for example, a liquid crystal matrix or light control arrangement) is controlled with the values of the brightness mask calculated preferably in two steps (first mask and second mask). The optical mask is thereby preferably positioned at a certain distance from the plane of the original so that an unfocused image of the mask (unfocused overlay) results. The dimensions of the brightness mask are preferably selected to be equal to or at least about the same as the number of the lines and columns of the optical mask matrix.

In the different steps of the calculation of the brightness mask, one preferably insures that the geometrical assignment of the matrix points or mask points remains in tact. This means especially that neighboring mask values of a mask value can be traced back to neighboring regions of the photographic image information underlying the mask value (while maintaining the orientation) so that the brightness mask and the image information to be copied are properly superimposed in the optical system.

In general, the image information to be copied can be the same as the photographic image information or arises therefrom through processing. In an optical system, the processing can be carried out, for example, by manipulation of the exposure through color filters, so that the (original) photographic image information (information of the photographic film) differs after the filtering from the film information to be copied, which is then superimposed with the mask.

This applies correspondingly for superimposition in a processor. There, the photographic image information is often digitally present in high-resolution. This digital image information is, as already mentioned, preferably reduced in a first step of the process in accordance with the invention for the determination of the brightness mask (derivation of the photographic image data). However, for the determination of the image information to be copied no reduction or preferably only a small reduction is carried out. But preferably the processing step is a correction transformation (see EP 0586773 A1). The image information obtained after the correction transformation is then the image information to be copied, which is to be superimposed with the brightness mask (in a processor).

The masking in a processor is preferably carried out digitally or electronically. The brightness mask (in the two-step process the second mask) is thereby transformed by way of one of the known interpolation processes (for example, "image resampling", "image resizing", "up sampling". . . ) into an image with the resolution of the image information to be copied, preferably smoothed by way of a low pass filtering (preferably during or after the interpolation) and subsequently superimposed in a processor with the original image matrix. A preselected connection function is selected, for example, simple addition, for the superimposition in the processor. If the mentioned smoothing is carried out, this process corresponds to the unfocused projection in the case of the optical masking.

As mentioned above, the brightness mask is preferably derived from the gray values, which are in turn determined from the optimized image data. However, the brightness mask can also be calculated respectively separately for the processing of image information of different color to be copied (for example, for the red, green and blue exposure). Those brightness values of the optimized image data which are assigned to a specific color are thereby preferably used for the calculation of the brightness matrix intended for the corresponding color. If only one mask is used, the color information included in the optimized image data can also be taken into consideration.

BRIEF DESCRIPTION OF THE DRAWINGS

Exemplary embodiments of the present invention are described in the following. Further preferred features are thereby disclosed. Different features of different embodiments can be combined with one another.

DETAILED DESCRIPTION OF THE PREFERRED EMBODIMENT

Figure 1A:
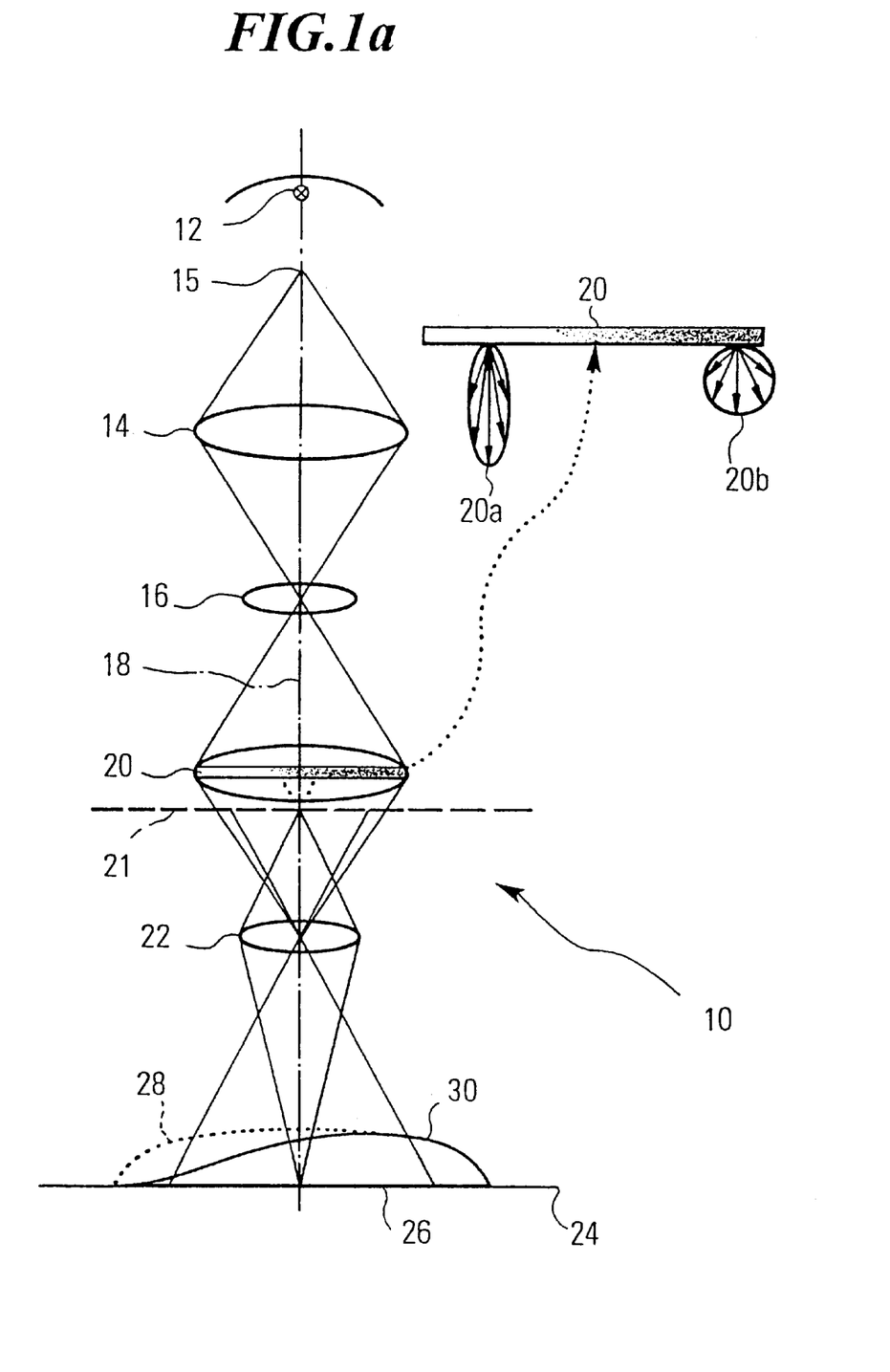
FIG. 1a shows a schematic cross-section of the construction of an exposure device with a light density control arrangement which is controlled with the values of the brightness matrix in accordance with the invention.

An exposure arrangement 10 is generally illustrated in FIG. 1 which includes an LCD arrangement 20 which is controlled with the values of the brightness matrix. Not illustrated are the optical arrangements (filter), which serve the control of the exposure in the three colors red, green and blue.

The liquid crystal matrix is positioned at a suitable distance from the plane of the film.

A light beam originating from a light source 12 is shone by way of an optical arrangement 14,16 and along the optical axis 18 through a material band of negatives 21. The LCD arrangement 20 with the features according to the invention is positioned before the negative 21.

The LCD arrangement 20 shown above right and enlarged in FIG. 1 has darkened regions 20b which leads to a larger light scattering so that less light is captured by the lens 22 in this region. Conversely, regions 20a are present, which are only little or not at all darkened or only over a short time period. Correspondingly, the opposite side 20b of the LCD arrangement 20 can be darkened over a longer time.

The light passing through the LCD arrangement 20 subsequently shines through the negatives 21 and is projected by the optic 22 onto a paper photo 26 of a band 24 with photo sensitive material. The curve 28 above the copy 26 here indicates the course of the light intensity across the copy 26, when the LCD arrangement 20 is not scattering. The continuous line 30 indicates the intensity course of the light when the LCD arrangement, as shown a top right in FIG. 1, is operated in an asynchronous scattering mode. Accordingly, the curve 30 is asymmetrical or distorted one-sided according to the light-dark-graduation of the LCD arrangement 20 above the material band 24 or above the copy 26 to be exposed.

Figure 1B:
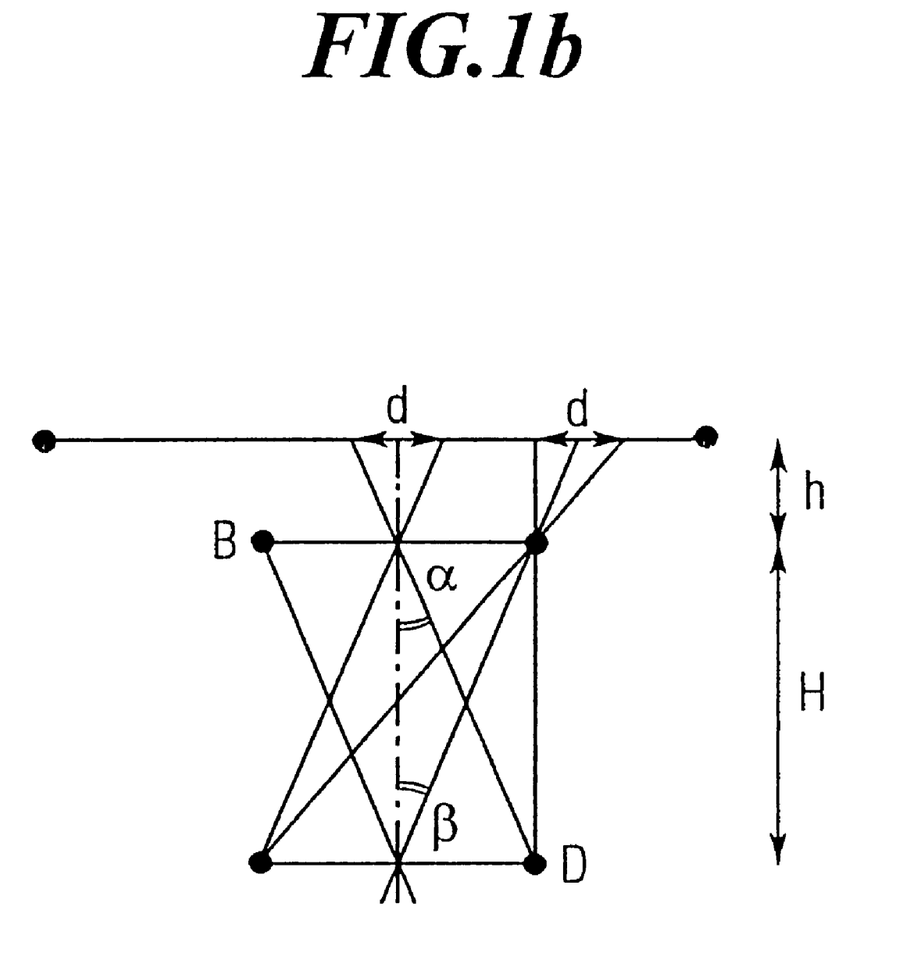
FIG. 1b shows the optical lengths during the copying.

The optical lengths occurring during the exposure are illustrated in FIG. 1. The following correlations apply:

$$\frac{D}{2H} = tg\ \alpha\ \text{numeric aperture} \approx 0.07\ (\alpha \approx 4')$$

$$\frac{B}{2H} = tg\ \beta\ \text{numeric image aperture}$$

$$\frac{h}{H} = \frac{d}{D}\ \text{defocusing}$$

$$\frac{d}{B} = \frac{h\ tg\ \alpha}{H\ tg\ \beta}\ \text{lack of focus}\ (\approx 0.1)$$

The liquid crystal matrix is positioned at a suitable distance h from the film plane, and a distance H exists between the pupil of the lens 22 shown in FIG. 1a and the liquid crystal.

A liquid crystal matrix can consist, for example, of 20×30 cells. The outer elements of the matrix are preferably outwardly broadened in order to catch impreciseness in the positioning and a certain variability of the optical enlargement as well as to avoid optical edge effects. The active surface of the matrix is, for example, 33 mm ×48 mm. The distance h between the liquid crystal and the plane of the film is selected such that with exact positioning, at the most important enlargement and, for example, in the case of a 35mm negative (full format, nominal dimension of the negative 24 mm by 36 mm), the central region of the liquid crystal which is 30 mm ×45 mm large (20×30 square cells) is active as optical mask. The distance guarantees the required lack of focus of the mask projection onto the photographic paper.

A printer which uses the mask calculation principal in accordance with invention is, for example, equipped with two scanners, a color scanner with, for example, a resolution of 260×390 and a density scanner with, for example, a resolution of 260×390 image points, whereby the resolution is respectively per photographic image information to be processed (for example, per individual film negative). Both scanners preferably measure the negative image over its whole image surface (24 mm ×36 mm) on a homogeneous raster (Δx=Δy).

Principally, the image matrices which were obtained through the color scanner as well as the image matrices which were obtained through the density scanner can be used as starting points for the mask calculation and therefore serve as photographic image data. The image matrices of the color scanner are already present in a sufficiently low resolution so that the reduction of the image information present in digitized form can be left out and the digital image information directly used as photographic image data in the calculation of the mask.

Although on the one hand the calculation cost for the mask calculation increases when the image matrices of the density scanner are used, more freedom is available on the other hand in the selection of the dimensions ($M_2 \times N_2$) of the photographic image data arranged in a matrix. For general, if the information, which is obtained from the density scanner is present in an $M_1 \times N_1$-matrix, one can change to a reduced matrix by a reduction transformation with the dimensions $M_2 \times N_2$. This reduced matrix that includes the photographic image data which are to be used as a basis for the further processing for the mask calculation.

In a preferred embodiment, the photographic image data are formed by the reduced image matrix of the color scanner, since the latter at the same time forms a basis for a whole film or individual image analysis, as is disclosed, for example, in the above-mentioned EP 0586773.

As already mentioned, the photographic image data obtained thereof are subjected to a correction transformation in order to obtain the optimized image data. Gray values are then preferably produced therefrom.

In the case of a colored photographic image information (colored image matrix, the color values are preferably transformed into any color space wherein one of the axes describes the brightness of the image points in order to obtain therefrom the photographic image data to be derived from the photographic image information. If the color information is not further used (for example, for the analysis) it is also sufficient to calculate gray values from the color values (for example, by weighted averaging) which characterize the brightness of individual image points.

FIG. 2 shows possible functions for the calculation of the gray values into values for a first mask matrix. The second mask matrix is then formed from the first matrix in the later step, which is then equal to the brightness mask which is superimposed onto the film information to be copied.

In FIG. 2, the brightness D of the gray values of the optimized image data (in the following referred to as "optimized gray values") is plotted on the abscissa. Since bright points in the desired photographic copy correspond to high densities of the negative, D can be considered a standardized (corrected) film density or negative density. In the selected illustration, the (corrected or optimized) value D=0 corresponds to a "normal" or "mean" brightness in the photographic copy (when no masking is carried out), while positive values of D correspond to brighter regions and negative values of D correspond to darker regions in the photographic copy (when no masking is carried out). The ordinata on the other hand illustrates the "optical density" K of the mask. Positive values of K cause a brightening in the photographic copy, negative values a darkening compared to an unmasked copying process. For the physical realization of the optical mask, the passive mask is preferably used rather than an active mask (for example, LED matrix). The darkening of the lights (negative branch of the characteristic lines in FIG. 2) must in this case with a negative film be achieved by longer/more intense exposure.

Figure 2A:
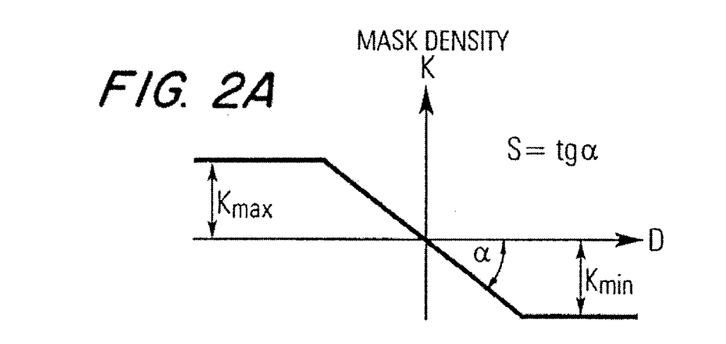
FIG. 2 shows an exemplary function for the calculation of the mask.
Figure 2B:
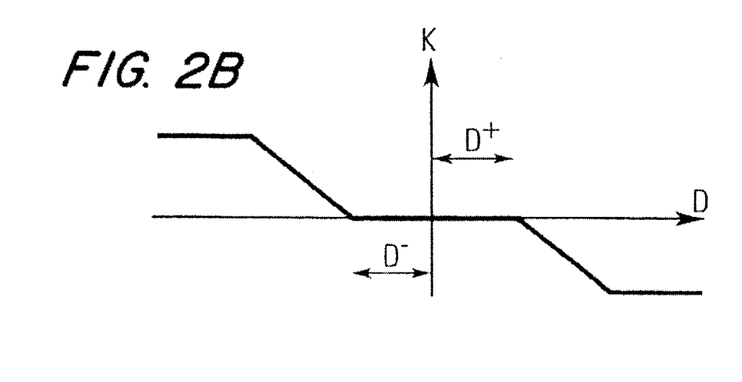

The characteristic lines in FIG. 2A corresponds to the conventional unfocused masking, whereby in addition a limiting of the mask upwardly and outwardly takes place. The strength of the masking is influenced by way of the steepness S of the characteristic line and the limiting values $K_{max}$, $K_{min}$ of the mask density. In general, is is advantageous to use the masking only for pronounced shadows and brighter regions in the image; a corresponding characteristic line is illustrated in FIG. 2B. A masking occurs only when the standardized film density exceeds the value D+ or falls below the value D−.

Figure 2C:
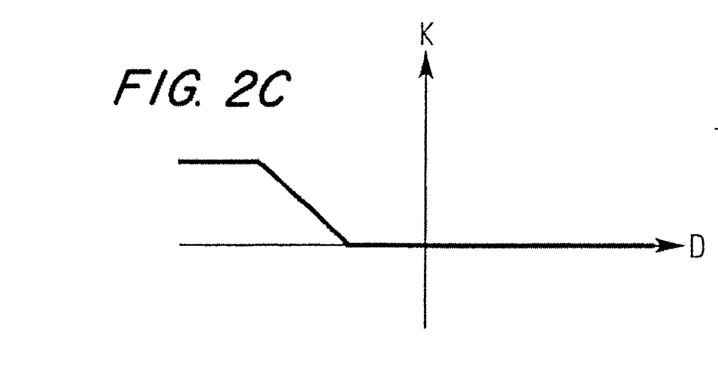
Figure 2D:
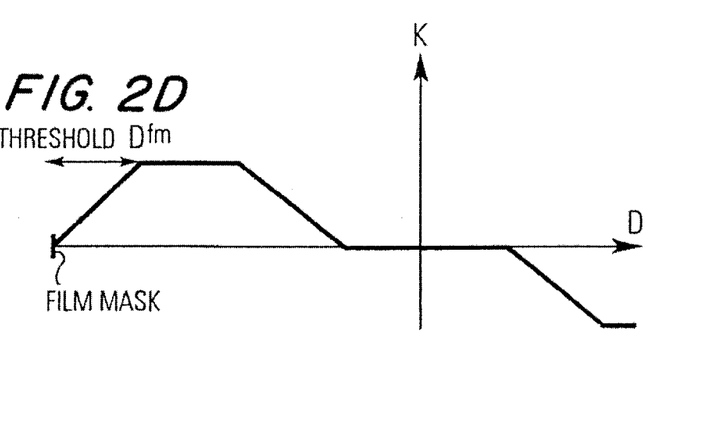

One can be satisfied with only brightening the shadows and leaving the light areas unchanged, which can be achieved with a characteristic line according to FIG. 2C. The advantage of this choice consists in that the masking does not cause an increase in the exposure times (and therefore no reduction in the printer throughput).

For aesthetic reasons, shadow regions which include little image information are not or only slightly masked. This is achieved with the characteristic line of FIG. 2D in that the masking is attenuated starting at a selectable threshold $D^{fm}$ with increasing approaching of the negative density to the film mask.

A number of picture categories are present wherein a masking can be disadvantageous. Examples are night photographs and sunsets wherein the maximum density of the photographic paper is not to be reduced in any case. This can be achieved partially with the characteristic line of FIG. 2D. However, such pictures are preferably completely excluded from a masking. For this purpose, the fact can be used that the image analysis provides a classification of the photographic image information (negative) according to its image content. Night photographs and sunsets accumulate thereby in specific classes which can be excluded from a masking. More generally, is also possible to optimize the masking individually for each image class through the different characteristic line parameters illustrated in FIG. 2 (S, $K_{max}$, $K_{min}$, D+, D−, $D^{fm}$).

In accordance with invention, the masking can be selectively attenuated or strengthened depending on the character of the photographic image information or the photographic image data and/or the image recording (for example, film type, stored information about the image recording, for example, photograph with or without flash, etc.), or depending on the classes.

The first masks calculated according to the above process can also be further processed. Especially a further smoothing can be advantageous, which further supports the already mentioned blurriness.

Figure 3:
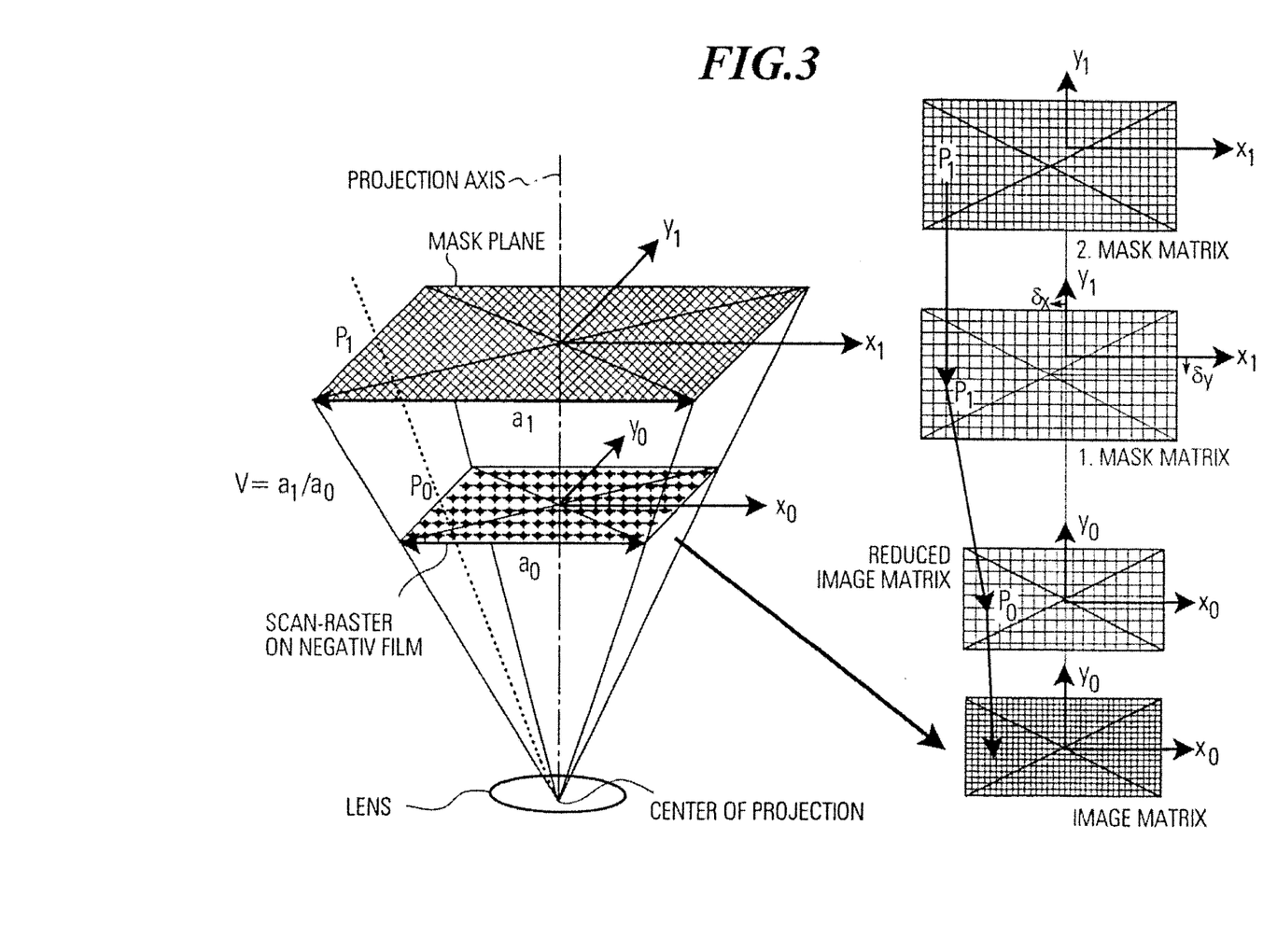
FIG. 3 schematically shows geometric transformations which are carried out for the calculation of the mask.

FIG. 3 schematically illustrates the geometric transformations used in the transformation of a matrix into another matrix. The illustrated image matrix thereby corresponds to the photographic image information and the illustrated reduced image matrix to the photographic image data.

On a basis of the known geometric relationships (distance of the plane of the film from the pupil of the lens, distance between film and mask planes) as well as the knowledge of a possible displacement of the physical center of the mask relative to the projection axes a point $P_0$ in the film plane with the coordinates $(x_0,y_0)$ can be obtained corresponding to each point $P_1$ in the mask plane with coordinates $(x_1,y_1)$ (and vice versa). On the basis of the knowledge of the scanner resolution in the $x_0$ and $y_0$ direction, the mask a resolution in the $x_1$ and $y_1$ direction and the knowledge of the reduction factors $M_1/M_2$, $N_1/N_2$, $M_2/M_3$, $N_2/N_3$ an "assigned element" can be determined for each element in one of the matrices as well as an assigned environment (assigned region) in the other three matrices. It is hereby pointed out that the dimension $M_1$, $N_1$ is the dimension of the reduced digital image data. A matrix with the dimension $M_2 \times N_2$ represents the (reduced) photographic image data which form the basis of the mask calculation. The dimension of the first mask is also preferably equal to $M_2 \times N_2$. The dimension of the second mask derived from the first mask is $M_3 \times N_3$.

Figure 4:
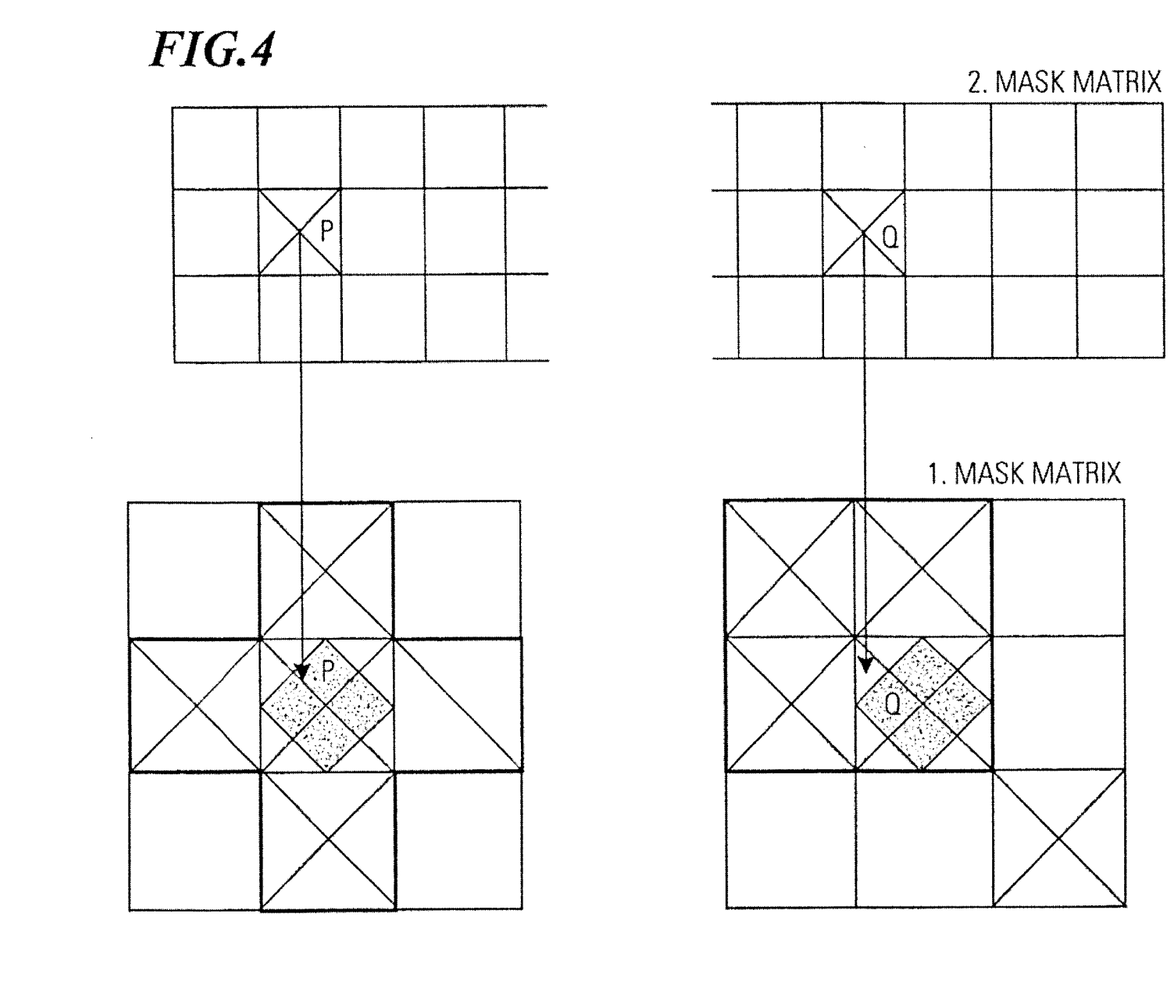
FIG. 4 shows an exemplary assignment process at a transition from the first mask to the second mask.

FIG. 4 shows an example how an "associated environment" (associated region or manipulation region) is determined. This determination is preferably carried out to achieve a calculation of the first mask matrix (first mask) into the second mask matrix (second mask).

A locally different manipulation of the brightness mask is preferably achieved such that the properties or attributes of the associated environment (the assigned region) of the first matrix are taken into consideration for the calculation of each element of the second mask matrix.

The geometric center (P or Q) of an element of the second mask is first determined for the assignment. The element of the second mask can be assigned to an element of the first mask of a basis of the coordinates of this point, as illustrated in the figure. The determination of the "assigned environment" is carried out on the basis of the distances of P (or Q) from the geometric center points of the neighboring elements of the first mask matrix. One distinguishes between two cases:

If P (or Q) lies within the hatched elevated square in the associated pixel, the "assigned environment" consists of five elements of the first mask matrix as shown on the left side in FIG. 4.

If Q (or P) lies outside of the mentioned square, the "associated environment" consists of four elements of the first mask matrix is illustrated on the right side of FIG. 4.

In both cases, the "assigned environment" are the (four or five) elements of the first mask matrix with the smallest distance of the geometric centers to P or Q.

And efficient calculation of the second matrix from the first matrix is preferably achieved with a table calculated in advance, which for each element of the second mask matrix includes the number and the indices of the elements of the "assigned environment" in the first mask matrix. The special cases which are generated at the edge of the matrices can be elegantly considered with such a table.

Figure 5:
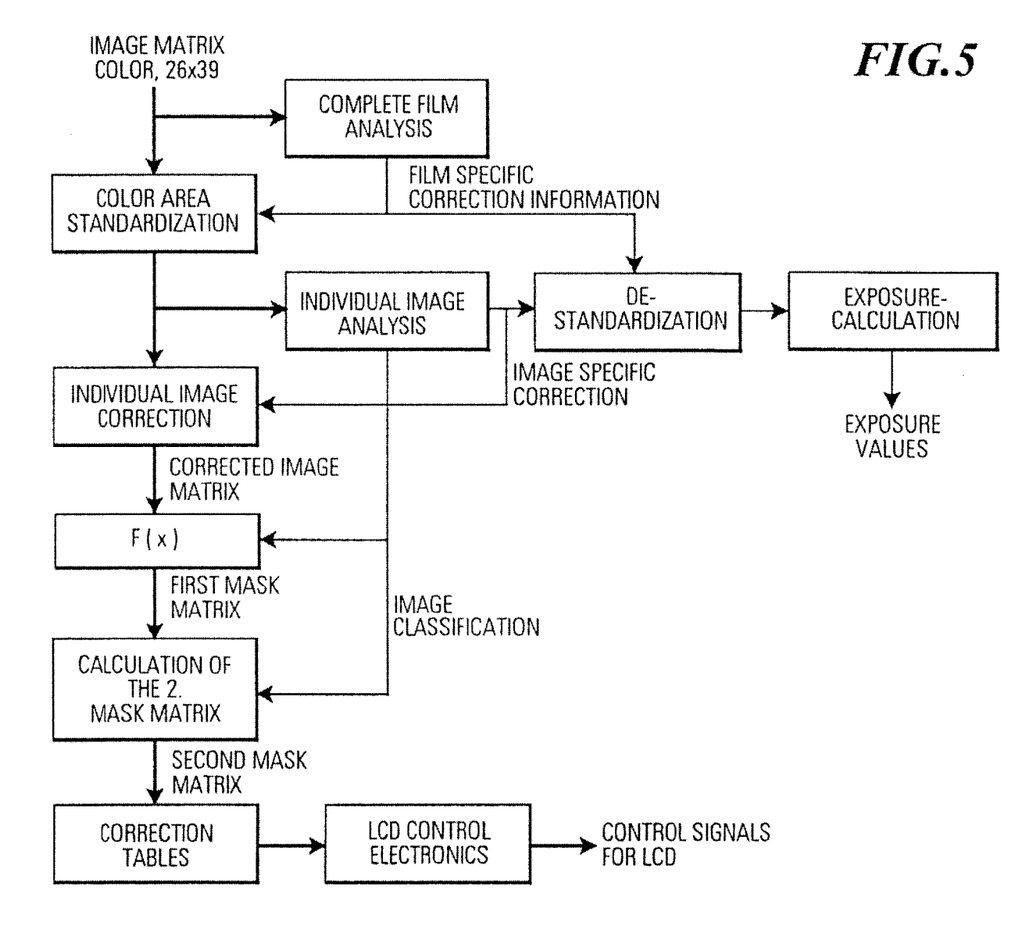
FIG. 5 shows a signal and data flow diagram with an optical printer.

FIG. 5 illustrates the data and signal flow was in the case of optical photographic printer which uses a negative film as copying original (photographic image information).

The input image matrix has a resolution of 26×39 so that a reduction step is obviated. The color data are already present in the color area in which one of the axes describes the brightness. They are determined from the spectral measured data by way of the "Karhunen Loeve" transformation as described in EP 0475897. First, a film specific correction transformation is determined on the basis of the measured data of the whole film, as described in EP 0586773. The image matrices (photographic image data) which are subjected to this transformation ("color space standardization") are individually analyzed and classified. The image corrections resulting from this analysis are on the one hand applied to the standardized image matrices and on the other hand serve the determination of the exposure values with which the corresponding negative is to be copied. The image matrix (optimized image data) subjected to the film specific and image specific correction is now used for the calculation of the first mask matrix. An optimized function F(x) for an image class determined on the basis of the individual image analysis is used which preferably causes the desired brightness changes.

The second mask matrix is calculated in a subsequent step. A second element $X_2(i_0,j_0)$ of the second mask matrix can be calculated as follows from the elements $XI(m,n)$ of the first mask matrix:

Let $U(i_0,j_0)$ be a region of the matrix $X_1$ assigned to the element $X_2(i_0,j_0)$, for example, $U(i_0,j_0)=\{(m_0,n_0), (m_0+,n_0), (m_0-1,n_0),(m_0,n_0+1), (m_0,n_0-1), (m_0+1,n_0+1), (m_0+1,n_0-1), (m_0-1,n_0+1), (m_0-1,n_0-1)\}$, and $N(i_0,j_0)$ the number of elements in $U(i_0,j_0)$.

Then, the following formula can be used for the calculation of $X_2$:

$$X_2(i_0,j_0)=\alpha_{max}*\text{Max}(i_0,j_0)+\alpha_{min}*\text{Min}(i_0,j_0)+\alpha_{mean}*\text{Mean}(i_0,j_0)+\alpha_{Med}*\text{Med}(i_0,j_0)$$

(with $\alpha_{Max}, \alpha_{Min}, \alpha_{Mean}, \alpha_{Med} \geq 0$ and $\alpha_{Max}+\alpha_{Min}+\alpha_{Mean}+\alpha_{Med}=1$).

The above-mentioned parameters $\alpha_{Max}, \alpha_{Min}, \alpha_{Mean}, \alpha_{Med}$ are preferably selected depending on the class in order to obtain an optimum result.

The above described functions Mean and Median correspond to a smoothing. For example, if the standard deviation is used as function, then that is a measure for the detail contrast. With the standard deviation can be achieved that regions with little image information are less strongly masked. The function Minimum causes a "cautious" masking. It can be used for the prevention of irritating side effects (excessive edge variations) which can occur upon strong masking. The use of the standard deviation function therefore causes different manipulations of the values of the brightness mask depending on the local properties of the image (lower or higher information content). The function Maximum can be used for the reduction of excessive edge variations.

Before a liquid crystal matrix can be controlled through an LCD control electronic with the mask values obtained therewith, the mask values are preferably further corrected. Correction tables are preferably provided therefor. With the correction, inhomogeneities in the brightness profile of the photographic copy caused by the optical copying or the optical arrangement (especially as schematically shown in FIG. 1a) are considered. However, inhomogeneities caused by the copy medium (photographic paper) or properties specific for the median used can also be considered. Especially, local inhomogeneities of the liquid crystal matrix and inhomogeneities upon illumination in the exposure plane or copying plane as well as especially the specific voltage transmission curve of the liquid crystal are considered. The LCD control electronic is then controlled with these corrected mask values.

Figure 6:
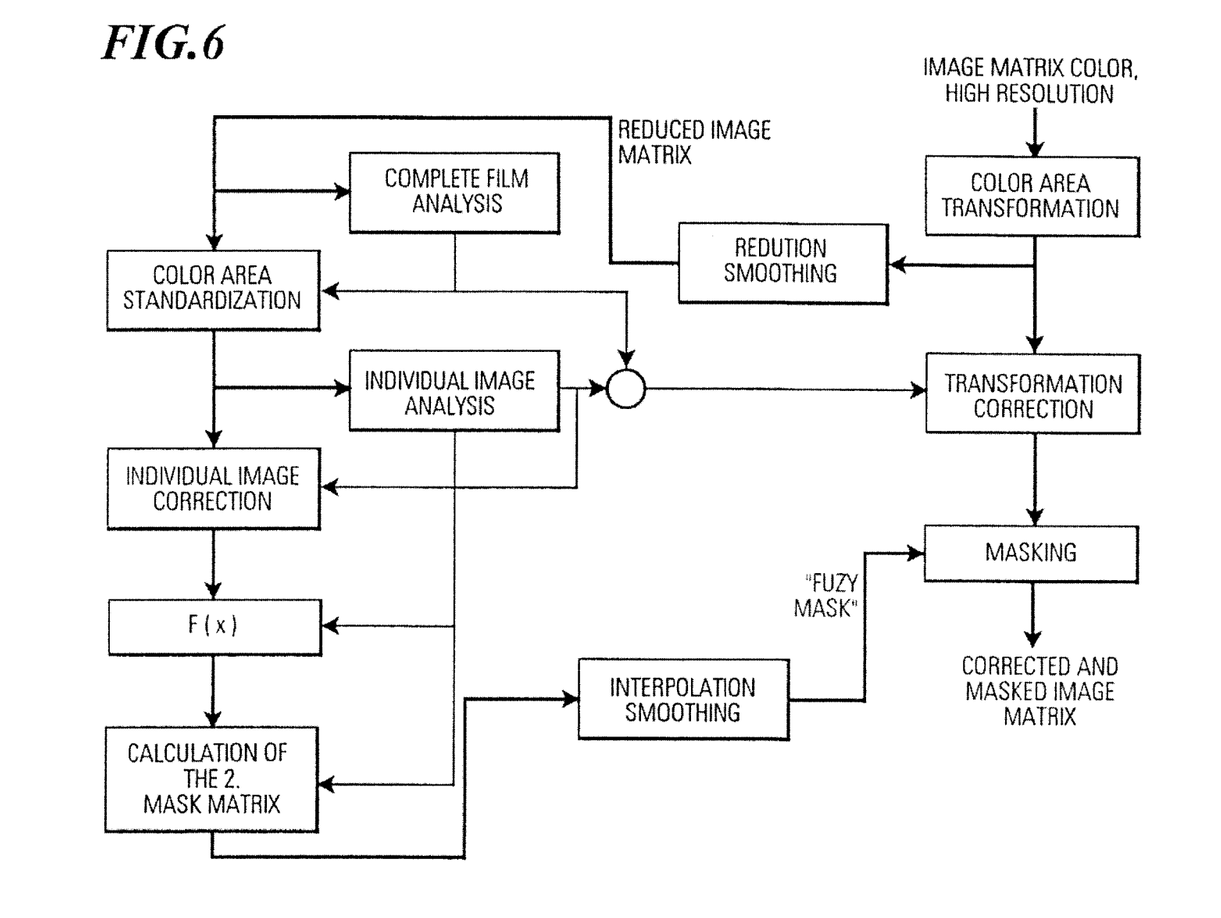
FIG. 6 shows a data and signal flow diagram in a digital printer.

FIG. 6 image dates the data and signal floats in the case of additional printer, where in all sole negatives are used as the copy masters (photographic image information).

As far as the same function blocks are used in FIG. 6 as in FIG. 5, reference is made to the description of FIG. 5.

$\text{Max}(i_0, j_0) = \text{Max}\{XI(m, n), (m, n)\varepsilon U(i_0, j_0)\}$: (Maximum of the elements of $X_1$ in the region $U$ $\text{Min}(i_0, j_0) = \text{Max}\{XI(m, n), (m, n)\varepsilon U(i_0, j_0)\}$: Minimum of the elements of $X_1$ in the region $U$ $\text{Mean}(i_0, j_0) = \sum XI(m, n)/N(i_0, j_0)$ $(m, n)\varepsilon U(i_0, j_0)$: Mean of the elements of $X_1$ in the region $U$ (instead of the normal mean, a weighted mean with low pass effect can also be used)

$\text{Med}(i_0, j_0) = \text{Median}\{XI(m, n), (m, n) \varepsilon U(i_0, j_0)\}$: Mean of the elements of $X_1$ in the region $U$ (in the region $U$ there are (about) the same amount of elements of $X_1$ is smaller than larger than "$Med$")

Differences between FIGS. 5 and 6 exist in the units specific for the optical copying, such as the illumination calculation and to the control of the LCD.

The photographic image information which goes into FIG. 6 is present in the form of a color and high-resolution matrix (in RGB form). This image matrix is preferably initially transformed into a color area in which one of the axes describes the brightness. The image matrix so transformed is reduced to a lower resolution for the purpose of film analysis, image analysis and mask calculation. The reduced image matrix (photographic image data) has now properties which are comparable with the one of the entry image matrix in FIG. 5.

The corrections resulting from the analysis are not only used for the mask calculation but also preferably used for the correction of the high-resolution image matrix (correction transformation).

The second mask matrix is determined as described herein. It is inflated to a high-resolution which is superimposed with the image matrix by way of interpolation and low pass filtering.

The described invention relates also to software or to a program (especially compiled software) for the execution of the process in accordance of the invention as well as a computer readable storage medium (CD-ROM, DVD, diskette, hard drive, etc.) with the software in accordance for the invention stored thereon.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Process for determining a mask for changing a brightness profile of a photographic copy, comprising the steps of:
    a) deriving photographic image data from photographically recorded image information;
    b) obtaining optimized image data by correction of the photographic image data such that errors which were created during photographic recording of the image information are considered; and
    c) determining a brightness mask having values which embody an influencing of the brightness profile of the photographic copy, wherein gray values are determined in step b) which correspond to the optimized image data and which are used for the determination of the brightness mask.

2. Process according to claim 1, including steps of:
    extracting attributes from the optimized image data for analysis of the optimized image data; and
    modifying at least one of: the optimized image data before step c), and the values of the brightness mask in step c), depending on the extracted attributes.

3. Process according to claim 2, wherein the image information to be copied is classified based on the extracted attributes, and the step of modifying is carried out depending on a classification result.

4. Process according to claim 1, wherein the values of the brightness mask are modified depending on at least one of: attributes of one region of the photographic image data, optimized image data and the brightness mask associated with a respective local value.

5. Process according to claim 1, wherein a brightening of darker regions caused by the brightness mask is no longer carried out or is attenuated, when a degree of darkness exceeds a preselected threshold.

6. Process according to claim 1, wherein in step c) only one mask value is assigned to each optimized image datum, form which the brightness mask is determined.

7. Process according to claim 6, wherein assigned mask values form matrix elements of a first mask matrix and a second mask matrix is calculated from the first mask matrix, a matrix element of the first mask matrix being assigned to each matrix element of the second mask matrix and the value of each matrix element of the second mask matrix being calculated from values of the matrix elements of the first mask matrix which are included in an associated region of the first mask matrix and which includes an assigned matrix element and matrix elements surrounding the assigned matrix element, the first mask matrix forming the brightness mask.

8. Process according to claim 7, wherein for calculating each element of the second mask matrix, attributes of the region of the first mask matrix assigned to the element are considered.

9. Process according to claim 1, wherein the step of deriving the photographic image data according to step a) includes a loss associated reduction of a data volume.

10. Process according to claim 1, wherein a number of mask values is less than 2000.

11. Process for changing the brightness profile of a photographic copy, wherein a photographic copy is produced based on photographic image information and a brightness mask is calculated according to the process of claim 2 comprising the step of:
    superimposing the brightness mask with the image information to be copied for influencing the brightness profile of the photographic copy.

12. Process according to claim 11, wherein the superimposing is carried out optically with a light density control arrangement which controls the light density, resolved by area in different regions of the copy to be produced and during exposure of the copy material, by controlling the light density control arrangement based on the values of the brightness mask.

13. Process according to claim 11, wherein the superimposing is carried out in a computer and a calculated result is used for control of a printout of the photographic copy.

14. Process according to claim 1, wherein a number of mask values is less than 1000.

15. Process according to claim 1, wherein the values of the brightness mask are a function of at least one of the optimized image data and corresponding gray values.

16. A process for determining a mask for changing a brightness profile of a photographic copy, comprising the steps of:
    a) deriving photographic image data from recorded film;
    b) obtaining optimized image data by correction of the photographic image data such that errors which were created during photographic recording of the film are considered;
    c) determining a brightness mask having values which embody an influencing of the brightness profile of the photographic copy, wherein the brightness mask is based on the optimized image data; and
    d) exposing a photographic recording medium through the recorded film and the mask to create the photographic copy.

* * * * *